United States Patent [19]

Overton

[11] Patent Number: 4,988,520
[45] Date of Patent: Jan. 29, 1991

[54] BINDER FOR PELLETED ANIMAL FEEDS

[75] Inventor: Jerry D. Overton, Atlantic, Iowa

[73] Assignee: W. R. Grace & Co.-Conn., New York, N.Y.

[21] Appl. No.: 469,697

[22] Filed: Jan. 24, 1990

Related U.S. Application Data

[63] Continuation-in-part of Ser. No. 268,328, Nov. 7, 1988, abandoned.

[51] Int. Cl.$^5$ ............................................... A23K 1/00
[52] U.S. Cl. ...................................... 426/74; 426/454; 426/623; 426/630; 426/658; 426/807
[58] Field of Search ..................... 426/635, 69, 74, 72, 426/454, 512, 576, 807, 658

[56] References Cited

FOREIGN PATENT DOCUMENTS 1356954 6/1974 United Kingdom ................ 426/626
2086707 5/1982 United Kingdom ................ 426/658

Primary Examiner—R. B. Penland
Attorney, Agent, or Firm—James P. Barr

[57] ABSTRACT

This invention relates to a method of producing improved pelleted animal feeds. Under the process of this invention, an animal feed composition containing an effective amount of a water soluble form of calcium is compressed into pellets. The water soluble form of calcium present in the composition serves as both the source of mineral nutrition and as a pellet binding agent. The pelleted animal feeds produced by the process of this invention exhibit superior durability and produce less fines.

6 Claims, No Drawings 4,988,520

BINDER FOR PELLETED ANIMAL FEEDS

This is a continuation-in-part of application Ser. No. 268,328, filed Nov. 7, 1988, now abandoned.

BACKGROUND OF THE INVENTION

1) Field of the Invention

This invention relates to a pelleted animal feed composition and, more specifically, to a pelleted animal feed with increased hardness characteristics. Under the process of this invention, a nutritionally and pH balanced proportion of a water soluble form of calcium is added to an animal feed while the feed composition is in meal form, and which, when compressed, forms a pelleted animal feed with improved durability and less fines.

2) Background

At the present time, most animal feed manufacturers use some form of pelleting aid when producing their feed compositions. A major concern among animal feed manufacturers is the production of fines that occurs in the pellet mill, conveyers, coolers, sifters, bins, packers, etc. Recycling of fines is expensive since it greatly reduces production rates. In addition to concern about the expense, the repeated steaming and compression-temperature effects aggravate existing stability problems of vitamins and other additives. The importance of minimizing fines is therefore apparent.

One method of reducing fines in the production process is to decrease the pellet diameter of the pelleting die. However, this process requires a greater expenditure of energy, slows the production process, and causes more heat to be developed within the pellet which seriously affects the stability of certain labile ingredients within the feed formulation.

The other alternative is to incorporate a binding agent into the pellet composition. It is known in the prior art that binders and hardening agents can be utilized in the production of pelleted animal feeds to reduce the degree of fines. For example, present day manufacturing processes of pelleted animal feeds commonly use such binders as sodium or calcium bentonite (a trilayered aluminum silicate, montmorillonite), collagen protein derivatives, cane or wood molasses, various starches obtained as the by-products from whole grain processing, natural gums and fatty acids, spray dried calcium lignosulfonates, cellulose gums, hemicellulose extract as the by-product in the production of pressed wood, lignin sulfonates comprising one or a combination of the ammonium, calcium, magnesium or sodium salts of the extract of spent sulfite liquor drained from the sulfite digestion of wood, abaca or sisal. These commonly used pellet binders and their methods of use are well known in the art. However, many of these pellet binders have serious disadvantages. For example, the use of many of the above binders such as lignin sulfonate or wood molasses are unpalatable to some animals and thus actually decrease the nutritional value of the animal feed to which they are added. This is of particular importance in feeds for monogastric animals such as swine, which require a feed with high nutritional value.

Another disadvantage of some of these binders is their incompatibility with certain drugs or antibiotics that may be present in the feed. For example, bentonite and certain other pellet binders are not permitted in combination with certain drugs in animal feeds because the bentonite has been shown to interfere with the analysis of the drugs by the accepted methods.

Other problems with these binders include widely fluctuating prices and/or quality, particularly when the binder is obtained as a by-product of another production process, for example cane or wood molasses.

From an economic standpoint, animal feed manufacturers would prefer to produce pelleted feeds at the lowest energy input. Adding binders to their feed compositions has proven to be an acceptable way of producing more durable pellets that are able to withstand the rough handling experienced during the manufacturing, packaging and transportation operations. However, the binders themselves add additional costs to the feed composition in the form of an additional ingredient that must be ordered, stocked, inventoried, and added as a separate step in the manufacturing process. It would therefore be a major advantage for an animal feed manufacturer to use as a binder a substance that has the ability to provide the necessary pellet hardening properties and also supply the necessary nutrients to the feed composition. That is, if the binder could also act as a source of important mineral requirements, substantial savings would result.

Under the process of this invention, it has been discovered that water soluble forms of calcium can be substituted for the normal, non-soluble sources of calcium traditionally used in animal feeds and also act as a superior pellet binder. The hardened pellets of this invention have less fines and thereby give better cost efficiencies by reducing the amount of recycling of feeds through the pellet mill and gives better consumer satisfaction though less waste. That is, the presence of fines within a packaged animal feed reduces feeding efficiency since they are typically inedible or undesirable to the consuming animals. In addition, there is a reduction in the destruction of nutrients that are susceptable to heat damage.

While it is known in the prior art that calcium oxide or calcium hydroxide can be reacted with water-soluble sugars to cause solidification of the resultant mixture into solid animal feed supplement blocks, these animal feed supplements require between 10 to 95 percent soluble sugar content.

These solid animal feed supplement blocks typically contain molasses as the source of soluble sugar in amounts ranging from 20 to 95 percent. The animal feeds of this invention contain at most 9 percent molasses, typically less than 6 percent, and in some instances contain no molasses at all. It was therefore unexpected that the desired hardness could be achieved in pellets containing little or no soluble sugar. That is, the improved pellet durability obtained by this invention was unexpected and not obvious since the reactive materials of the prior art are either not present at all or found in levels far outside those required by the prior art references, and thus would not be expected to contribute to the pellet hardness.

OBJECTS OF THE INVENTION

An object of this invention is to make a hardened animal feed pellet without reducing the nutritional value of the feed.

Another object of this invention is to employ a hardening agent into pelletized animal feeds which reduces the level of fines, thereby reducing the amount of product recycling, and which also supplies a proper nutritional level of calcium.

Another object of this invention is to produce a pelleted animal feed which has improved durability and resistance to deterioration during manufacturing, transportation, storage and feeding.

Another object of this invention is to reduce the pellet mill die pressures, reduce the pellet mill die temperatures, and increase product throughput when producing hardened pelleted animal feeds.

Another object of this invention is to protect labile ingredients from exposure to excessive heat during the pelleting process.

These and other objects will be apparent from the remaining specification and the appended claims.

DETAILED DESCRIPTION

The present invention is directed to a process for forming hardened pelleted animal feeds. As used herein, the term animal feeds includes, but is not limited to pelleted feeds for livestock such as beef and dairy cattle, pigs, sheep, etc., poultry, fish, cats, dogs and the like. The principle behind this invention can be applied to any animal feed whether in block, pellet, wafer, cube, crumble or briquet form, and may also be used for extrusion products. The hardened pelleted animal feeds of this invention are formed by incorporating an effective amount of water soluble calcium into an animal feed composition, while the composition is in meal form, mixing the composition to assure a uniform blend, and compressing the composition into pellets. The amount of water soluble calcium to be added to the feed composition is determined by substituting an equivalent amount of water soluble calcium for one or all of the other sources of calcium normally present in the feed composition. The typical sources of calcium within a feed composition include ground limestone (as calcium carbonate), steamed bone meal, oyster shell flour, dicalcium phosphate or defluorinated phosphate. Under the process of this invention, all or a portion of those sources of calcium are omitted, and water soluble calcium is substituted therefor. The water soluble forms of calcium suitable for use in this invention include, but are not limited to, calcium hydroxide, calcium oxide, calcium chloride, calcium acetate, and the like, and is preferably calcium hydroxide.

When substituting calcium hydroxide or calcium oxide for these other calcium sources, there is another critical factor that must be considered. Due to the alkalinity of the calcium hydroxide, the pH of the final feed composition must be taken into consideration when determining the appropriate amount of calcium hydroxide. For most animal feeds the pH of the final feed composition should not exceed 7.0, and is preferably in the range 6.3 to 6.6. For the animal feeds described in this invention, calcium hydroxide can be added in amounts ranging from 0.2 to 3.0 weight percent of the total composition, and preferably from 0.3 to 1.4 weight percent. This level may vary somewhat due to the particular level of calcium needed for a particular animal feed, and the presence or absence of any pH buffering materials that may be present in a particular feed composition, and the final pH of the animal feed composition. If a particular animal feed has a higher calcium requirement than can be supplied by the water soluble forms of calcium (due to pH constraints), the balance of the calcium can be supplied by water insoluble forms of calcium such as calcium carbonate. For example, if an animal feed has a 5 percent calcium requirement, somewhere between 0.2 to 100% of this can be supplied by calcium hydroxide, depending on the pH limitation, and the balance of the calcium requirement can be obtained from calcium carbonate.

Without further elaboration, it is believed that one skilled in the art, using the preceding description, can utilize the present invention to its fullest extent. The following examples are provided to illustrate the invention in accordance with the principles of this invention, but are not to be construed as limiting the invention in any way except as indicated in the appended claims. All parts and percentages are by weight unless otherwise indicated.

EXAMPLE 1

To evaluate the effectiveness of calcium hydroxide as a pellet hardening agent, a number of actual feed mill tests were conducted to measure the effects on pellet durability and amount of fines. Control tests were also performed to compare the effect of using $Ca(OH)_2$ against a standard formulation.

A swine feed composition containing soybean meal, ground yellow corn, fish meal, dried whey product, wheat middlings, milo distillers, dried grains with solubles, cane molasses, dicalcium phosphate, calcium carbonate, salt and other trace minerals and vitamins was manufactured and pelleted. This formulation contained no calcium hydroxide. A similar formulation was prepared which contained 0.70 weight percent calcium hydroxide in place of the calcium carbonate. The pellets were tested for pellet durability (PDI) and percent fines.

|  |  | AVG. | | | | |
| --- | --- | --- | --- | --- | --- | --- |
| Pellets without | PDI (%) | 88.7 | 87.5 | 90.0 | 88.9 | 88.8 |
| $Ca(OH)_2$ | % Fines | 1.7 | 2.1 | 1.5 | 1.5 | 1.7 |
| Pellets with $Ca(OH)_2$ | PDI (%) | 90.1 | 89.6 | 94.3 | 93.5 | 91.9 |
|  | % Fines | 1.8 | 1.8 | 1.2 | 1.2 | 1.5 |

EXAMPLE 2

The experiment as described in Example 1 was repeated with the following results:

| Pellets without $Ca(OH)_2$ | PDI (%) | 84.6 | 84.2 |
| --- | --- | --- | --- |
|  | % Fines | 2.4 | 2.37 |
| Pellets with $Ca(OH)_2$ | PDI (%) | 89.2 | 88.7 |
|  | % Fines | 1.96 | 1.81 |

EXAMPLE 3

The experiment as described in Example 1 was repeated, except that the percent of calcium hydroxide added to the formulation was reduced to 0.56% and was pre-mixed with a lignin sulfonate binder.

| Pellets without $Ca(OH)_2$ | PDI (%) | 84.6 | 84.2 |
| --- | --- | --- | --- |
|  | % Fines | 2.4 | 2.4 |
| Pellets with $Ca(OH)_2$ | PDI (%) | 89.2 | 88.7 |
|  | % Fines | 1.96 | 1.81 |

EXAMPLE 4

The experiment as described in Example 1 was repeated with the following results:

| Pellets without $Ca(OH)_2$ | PDI (%) | 89.5 | 88.1 |
| --- | --- | --- | --- |
|  | % Fines | 2.3 | 2.5 |

| -continued | | | |
|---|---|---|---|
| Pellets with Ca(OH)₂ | PDI (%) | 90.5 | 91.3 |
| | % Fines | 1.44 | 1.70 |

EXAMPLE 5

The experiment as described in Example 1 was repeated except that the feed composition was pelleted at a different location.

| Pellets without Ca(OH)₂ | PDI (%) | 96.4 | 96.7 | 93.5 |
|---|---|---|---|---|
| | % Fines | 1.95 | 2.76 | 2.0 |
| Pellets with Ca(OH)₂ | PDI (%) | 96.2 | 96.5 | 93.1 |
| | % Fines | 0.94 | 1.00 | 0.01 |

EXAMPLE 6

The experiment as described in Example 1 was repeated except that the feed composition was pelleted at a third location.

| Pellets without Ca(OH)₂ | PDI (%) | 82.4 | 81.3 |
|---|---|---|---|
| | % Fines | 4.12 | 4.12 |
| Pellets with Ca(OH)₂ | PDI (%) | 90.3 | 89.5 |
| | % Fines | 2.8 | 2.52 |

EXAMPLE 7

A swine feed composition for baby pigs containing soybean meal, ground yellow corn, fish meal, dried whey product, animal fat, blood meal, pulverized oats, dicalcium phosphate, calcium carbonate, salt and other trace minerals and vitamins was mixed and pelleted. This formulation contained no calcium hydroxide and no cane molasses. A similar formulation was prepared which contained 0.5 weight percent calcium hydroxide in place of the calcium carbonate. The pellets were tested for pellet durability (PDI) and percent fines.

| Pellets without Ca(OH)₂ | PDI (%) | 79.3 |
|---|---|---|
| | % Fines | 5.2 |
| Pellets with Ca(OH)₂ | PDI (%) | 83.0 |
| | % Fines | 5.1 |

EXAMPLE 8

The experiment as described in Example 7 was repeated with the following results:

| Pellets without Ca(OH)₂ | PDI (%) | 75.2 |
|---|---|---|
| | % Fines | 5.1 |
| Pellets with Ca(OH)₂ | PDI (%) | 77.6 |
| | % Fines | 5.6 |

EXAMPLE 9

A cattle feed composition containing a 5 percent or greater quantity of non-protein nitrogen in the form of urea, soybean meal, meat meal, dehydrated alfalfa meal, cane molasses, blood meal, linseed meal, cottonseed meal, milo distillers dried grains with solubles, animal fat, citric acid, urea, dicalcium phosphate, and calcium carbonate was manufactured and pelleted. This composition contained no calcium hydroxide. A similar formulation was prepared containing 0.7 weight percent calcium hydroxide.

| Pellets without Ca(OH)₂ | PDI (%) | 94.2 | 95.0 |
|---|---|---|---|
| | % Fines | 1.5 | 1.5 |
| Pellets with Ca(OH)₂ | PDI (%) | 96.6 | 97.0 |
| | % Fines | 0.8 | 0.7 |

EXAMPLE 10

A chicken feed composition containing soybean meal, meat meal, ground yellow corn, dehydrated alfalfa meal, brewers dried yeast, milo distillers dried grains with solubles, condensed fermented corn extractions, dried extracted streptomycin fermentation solubles, dicalcium phosphate, calcium carbonate, salt and other trace minerals and vitamins is manufactured and pelleted. This formulation contains no calcium hydroxide. A similar formulation is prepared containing 0.7 weight percent calcium hydroxide. Similar increased pellet durability indices and reduced fines are realized.

EXAMPLE 11

A swine feed formulation containing soybean meal, ground yellow corn, fish meal, dried whey product, wheat middlings, milo distillers grains with solubles, cane molasses, dicalcium phosphate, calcium carbonate, salt and other trace minerals and vitamins was used as the starting formula to which was added one of the following:

a. 0.7% Ca(OH)₂
b. 1.0% CaCl₂
c. 1.0% CaSO₄

When these additions were made, the calcium levels were adjusted by removing an equivalent amount of CaCO₃ from the respective formulation.

The above three formulations were then mixed and pelleted. The pellets were tested for pellet durability (PDI) and percent fines.

| Formula a. Ca(OH)₂ | PDI % | 94.5 | 95.0 | 94.8 |
|---|---|---|---|---|
| | % Fines | 1.71 | 1.65 | 1.68 |
| Formula b. CaCl₂ | PDI % | 93.1 | 93.2 | 93.2 |
| | % Fines | 1.96 | 1.90 | 1.93 |
| Formula c. CaSO₄ | PDI % | 91.2 | 90.6 | 90.9 |
| | % Fines | 2.62 | 2.43 | 2.53 |

The experiment demonstrates the appreciable improvement in PDI and fines reduction achieved by the addition of either Ca(OH)₂ or CaCL₂ to said formulation in direct contrast to the lack of improvement achieved with the addition of CaSO₄ (otherwise known as gypsum, i.e., plaster of Paris) to said formulation.

What is claimed is:

1. A process for producing pellete animal feeds with improved hardness and pellet durability consisting essentially of adding a pellet binder into a feed formulation in an amount effective to increase the hardness of the feed pellet, wherein the pellet binder comprises a water soluble form of calcium, and wherein the hardened feed pellet is free of reaction products of calcium and water soluble sugars except in impurity amounts.

2. The process according to claim 1, wherein the water soluble calcium is selected from the group consisting of calcium hydroxide, calcium oxide, calcium chloride and calcium acetate.

3. The process according to claim 1, wherein the effective amount of water soluble calcium is from 0.2 to 3.0 weight percent of the total feed formulation.

4. The process according to claim 1, wherein the effective amount of water solution calcium is from 0.3 to 1.4 weight percent of the total feed formulation.

5. The process according to claim 1, wherein the water soluble form of calcium is calcium hydroxide.

6. A process according to claim 1, comprising incorporating from 0.3 to 1.4 weight percent calcium hydroxide into the feed formulation.

* * * * *

UNITED STATES PATENT AND TRADEMARK OFFICE
CERTIFICATE OF CORRECTION

PATENT NO. : 4,988,520

DATED : January 29, 1991

INVENTOR(S) : Overton

It is certified that error appears in the above-identified patent and that said Letters Patent is hereby corrected as shown below:

COLUMN 6;

Claim 1, line 57, delete the word "pellete" and insert therefor --pelleted--.

COLUMN 7;

Claim 4, line 5, delete the word "solution" and insert therefor --soluble--.

Signed and Sealed this

Second Day of June, 1992

Attest:

DOUGLAS B. COMER

*Attesting Officer*     *Acting Commissioner of Patents and Trademarks*